(12) United States Patent
Hayashi

(10) Patent No.: US 11,400,584 B2
(45) Date of Patent: Aug. 2, 2022

(54) TEACHING METHOD

(71) Applicant: SEIKO EPSON CORPORATION, Tokyo (JP)

(72) Inventor: Akifumi Hayashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 14 days.

(21) Appl. No.: 17/067,646

(22) Filed: Oct. 10, 2020

(65) Prior Publication Data

US 2021/0107136 A1 Apr. 15, 2021

(30) Foreign Application Priority Data

Oct. 11, 2019 (JP) .............................. JP2019-188209

(51) Int. Cl.
| | |
|---|---|
| *B25J 13/08* | (2006.01) |
| *G05B 19/425* | (2006.01) |
| *B25J 9/00* | (2006.01) |
| *B25J 9/04* | (2006.01) |
| *B25J 9/16* | (2006.01) |

(52) U.S. Cl.
CPC ............ *B25J 9/0081* (2013.01); *B25J 9/046* (2013.01); *B25J 9/1694* (2013.01); *B25J 13/085* (2013.01)

(58) Field of Classification Search
CPC . B25J 9/0081; B25J 9/044; B25J 9/046; B25J 9/1664; B25J 9/1694; B25J 13/085; G05B 19/423; G05B 19/425; G05B 2219/33004; G05B 2219/33005; G05B 2219/39209; G05B 2219/35472; G05B 2219/35467; G05B 2219/40582; G05B 2219/40301
See application file for complete search history.

(56) References Cited

U.S. PATENT DOCUMENTS

| | | | |
|---|---|---|---|
| 2006/0254831 A1* | 11/2006 | Kamei | B62B 5/0026 180/6.5 |
| 2013/0041509 A1* | 2/2013 | Saito | B25J 9/047 700/261 |
| 2015/0290809 A1 | 10/2015 | Nakagawa et al. | |
| 2015/0321351 A1* | 11/2015 | Kapoor | G05B 19/427 700/264 |
| 2017/0266815 A1* | 9/2017 | Takeuchi | G05B 19/423 |
| 2018/0210434 A1 | 7/2018 | Iwatake | |

(Continued)

FOREIGN PATENT DOCUMENTS

| | | |
|---|---|---|
| JP | S59157715 A | 9/1984 |
| JP | 2015199174 A | 11/2015 |

(Continued)

*Primary Examiner* — Dale Moyer
(74) *Attorney, Agent, or Firm* — Gang Yu

(57) ABSTRACT

A teaching method is for teaching a position and attitude of a robot arm to a robot configured to switch between a first state where the third axis is located at one side of a first imaginary line and a second state where the third axis is located at the other side of the first imaginary line, the first imaginary line being set as a straight line passing through a first axis and a second axis when the robot arm is viewed from a direction along the first axis. The method includes performing a switching operation of switching between the first state and the second state according to a result of detection by a force detection unit.

5 Claims, 8 Drawing Sheets

(56) References Cited

U.S. PATENT DOCUMENTS

2019/0015972 A1* 1/2019 Someya ................ B25J 13/085
2020/0147787 A1   5/2020 Takahashi

FOREIGN PATENT DOCUMENTS

| JP | 2018118340 A | 8/2018 |
| JP | 2019018257 A | 2/2019 |
| JP | 2019018340 A | 2/2019 |

* cited by examiner

TEACHING METHOD

The present application is based on, and claims priority from JP Application Serial Number 2019-188209, filed Oct. 11, 2019, the disclosure of which is hereby incorporated by reference herein in its entirety.

BACKGROUND

1. Technical Field

The present disclosure relates to a teaching method.

2. Related Art

Recently, due to soaring labor costs and shortage of staff at industrial plants, work previously carried out manually has been increasingly automated with various robots and robot peripheral devices. Such various robots have a base, an arm supported on the base, and a force sensor, for example, as described in JP-A-59-157715. In such a robot, the arm is controlled based on the result of detection by the force sensor.

In the robot, prior to work, teaching to store the position and attitude of the robot arm in the work is performed. The teaching described in JP-A-59-157715 is performed by a method of having an operator apply a force to move the robot arm and then storing the position and attitude in the movement. The teaching method as described in JP-A-59-157715 can also be applied to a horizontal articulated robot.

Generally, the horizontal articulated robot performs work or teaching in the state where a joint part of the robot arm is bent. Bending patterns include a bending state similar to that of a human right arm and a bending state similar to that of human left arm, as viewed along the pivot axis of the joint. Performing teaching or work while properly switching between such states can restrain the robot arm from making an unwanted movement when performing the work.

However, when switching between the states as described above during teaching, the operator needs to operate a device giving an instruction to switch. Therefore, the operator needs to operate the device while applying a force to move the robot arm during teaching. This makes the operation during teaching complicated.

SUMMARY

The present disclosure is made in order to solve at least a part of the foregoing problem and can be implemented in the following manner.

A teaching method according to an application example is a teaching method for teaching a position and attitude of a robot arm to a robot. The robot includes: a base; the robot arm having a first arm that is coupled to the base and that rotates about a first axis, a second arm that is coupled to the first arm and that rotates about a second axis parallel to the first axis, and a third arm that is coupled to the second arm and that rotates about a third axis parallel to the first axis and the second axis or that moves along the third axis; and a force detection unit detecting a force applied to the robot arm. The robot is configured to switch between a first state where the third axis is located at one side of a first imaginary line and a second state where the third axis is located at the other side of the first imaginary line, the first imaginary line being set as a straight line passing through the first axis and the second axis when the robot arm is viewed from a direction along the first axis. The method includes performing a switching operation of switching between the first state and the second state according to a result of detection by the force detection unit.

DESCRIPTION OF EXEMPLARY EMBODIMENTS

The teaching method according to the present disclosure will now be described in detail, based on preferred embodiments illustrated in the accompanying drawings.

First Embodiment

Figure 1:
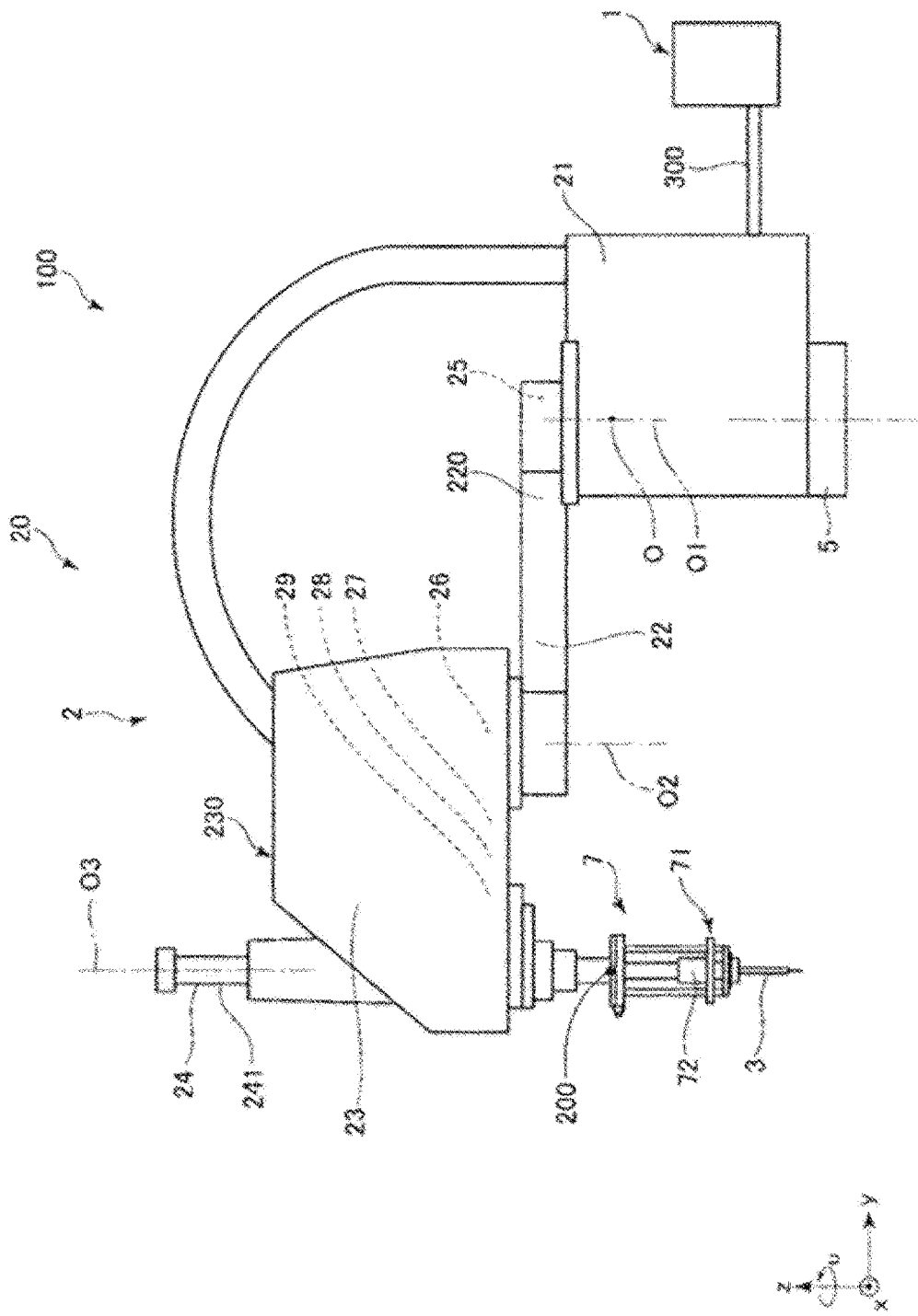
FIG. 1 is a side view showing a first embodiment of a robot system executing the teaching method according to the present disclosure.
Figure 2:
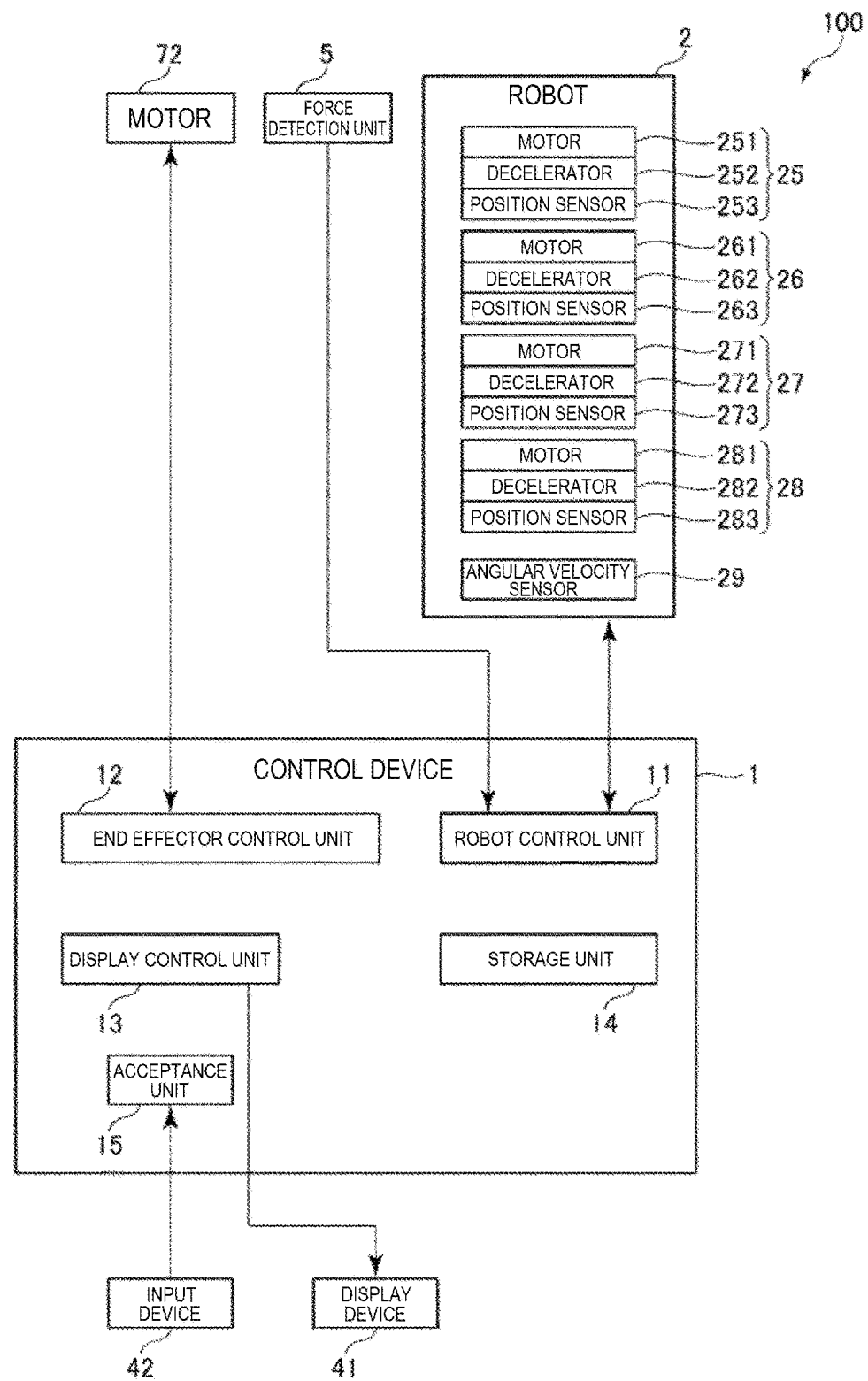
FIG. 2 is a block diagram of the robot system shown in FIG. 1.
Figure 3:
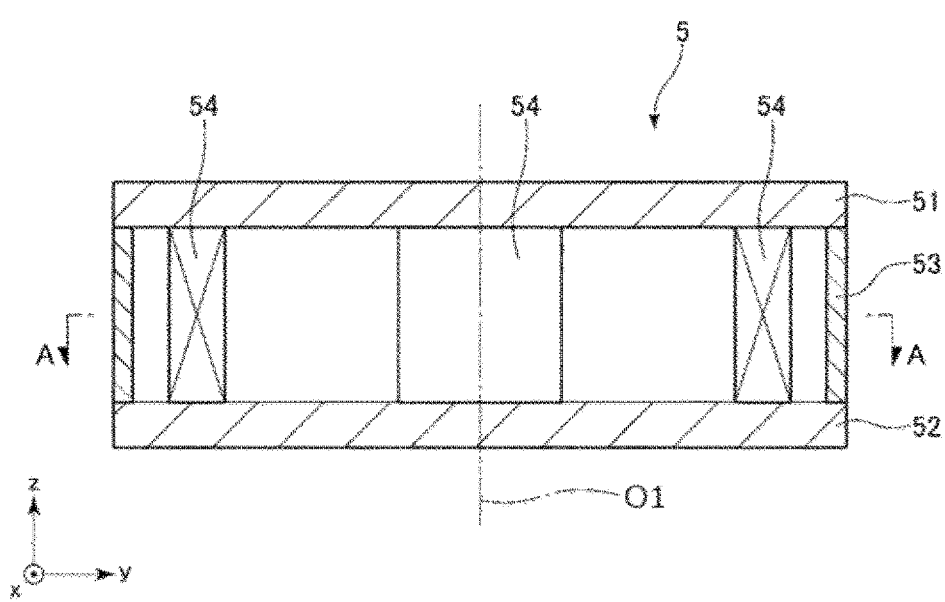
FIG. 3 is a side view of a force detection unit shown in FIG. 1.
Figure 4:
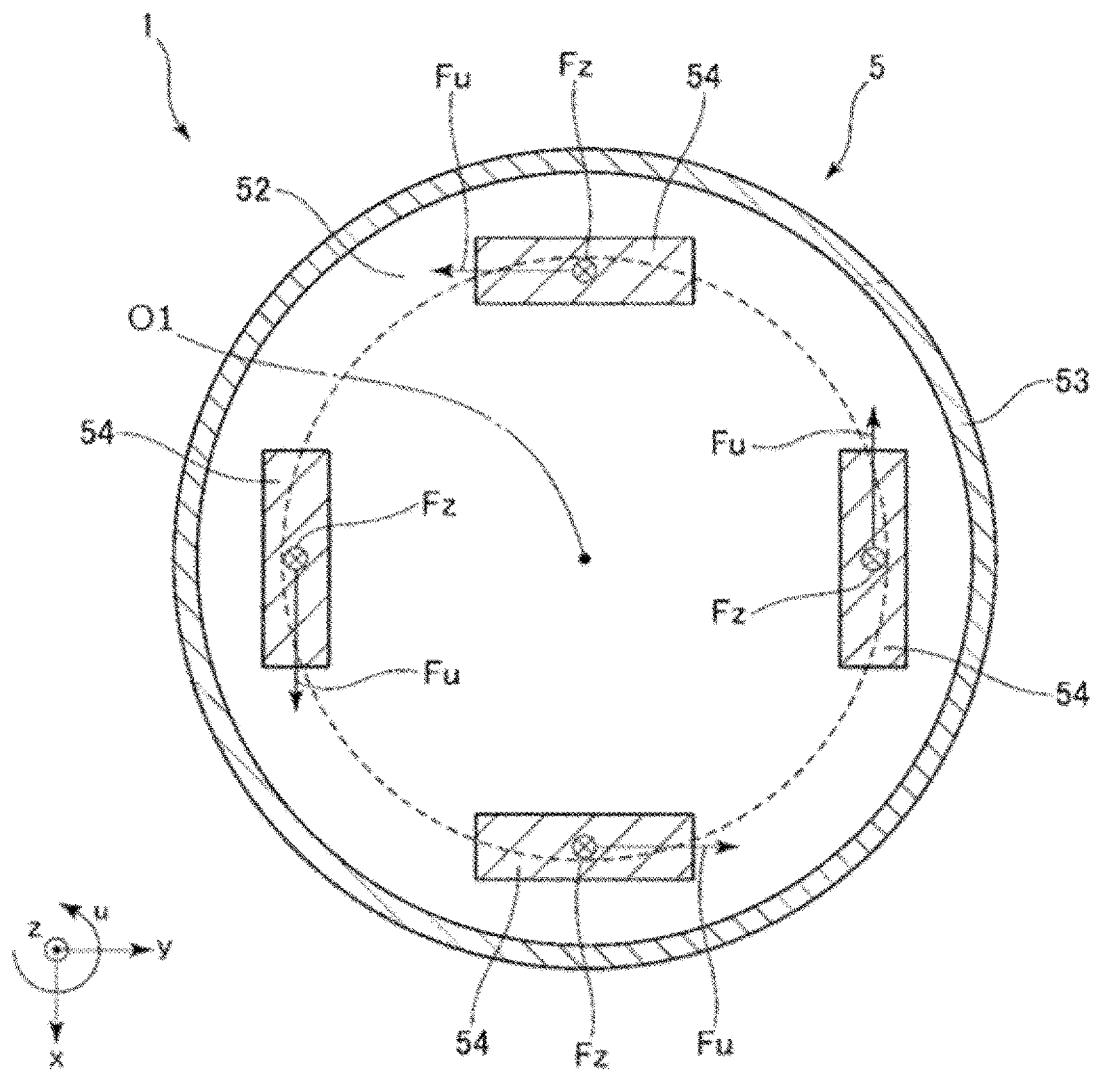
FIG. 4 is a cross-sectional view taken along A-A in FIG. 3.
Figure 5:
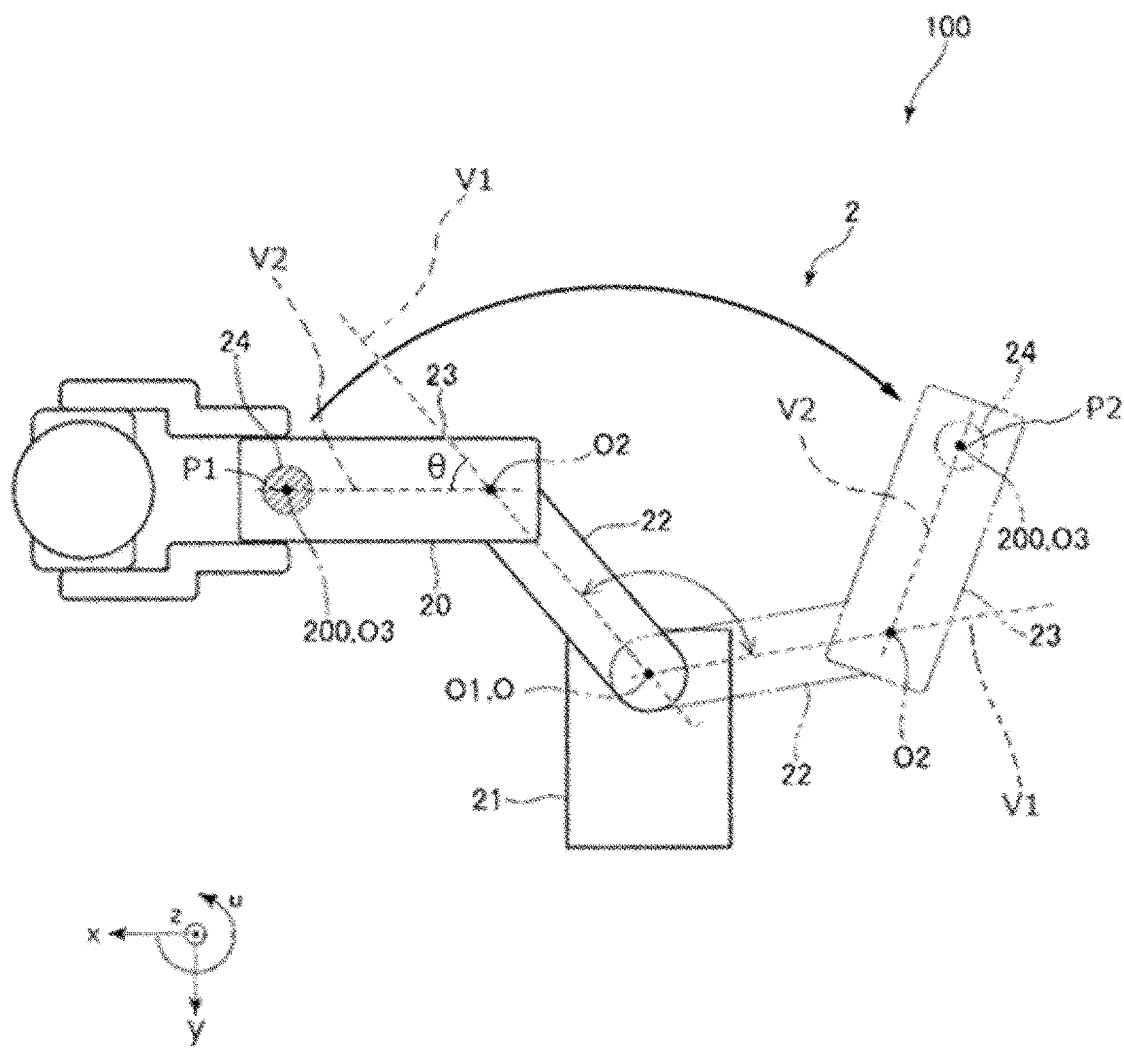
FIG. 5 explains the way teaching is performed to a robot shown in FIG. 1, as viewed from vertically above.
Figure 6:
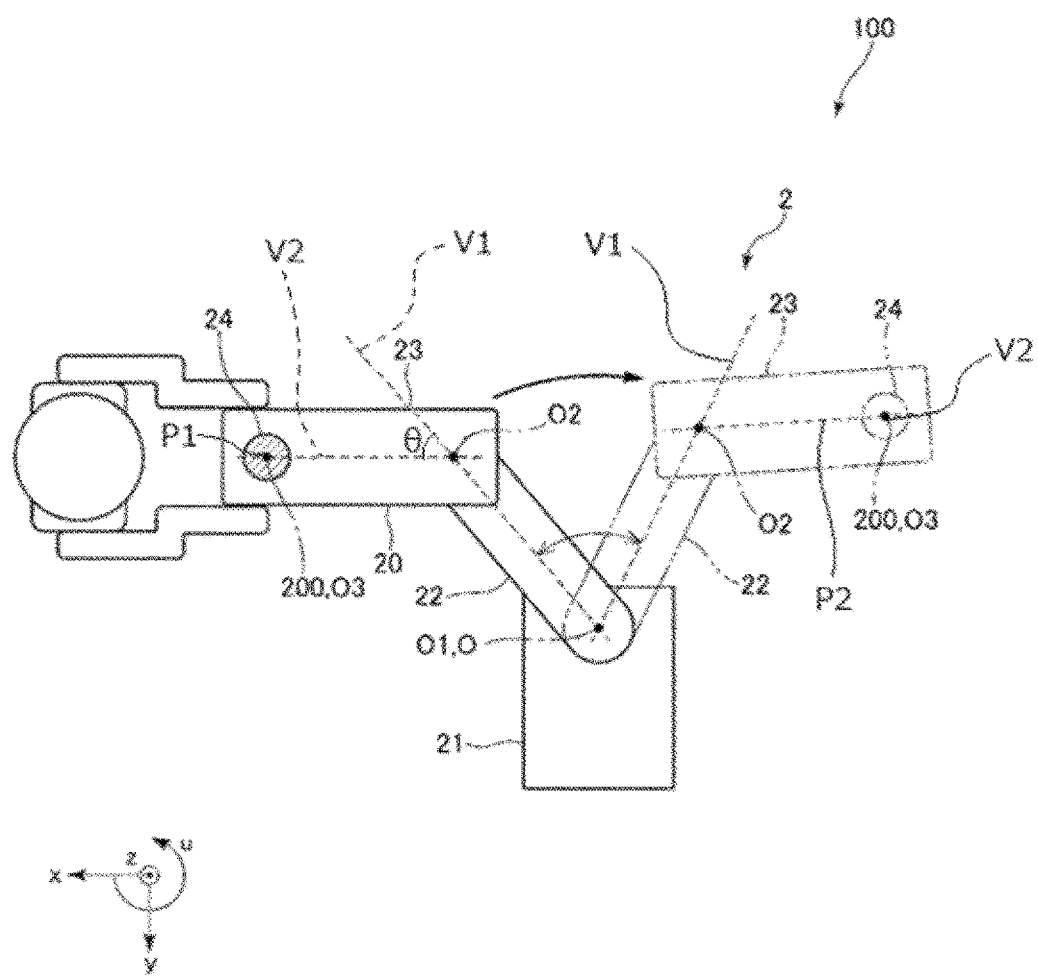
FIG. 6 explains the way teaching is performed to the robot shown in FIG. 1, as viewed from vertically above.
Figure 7:
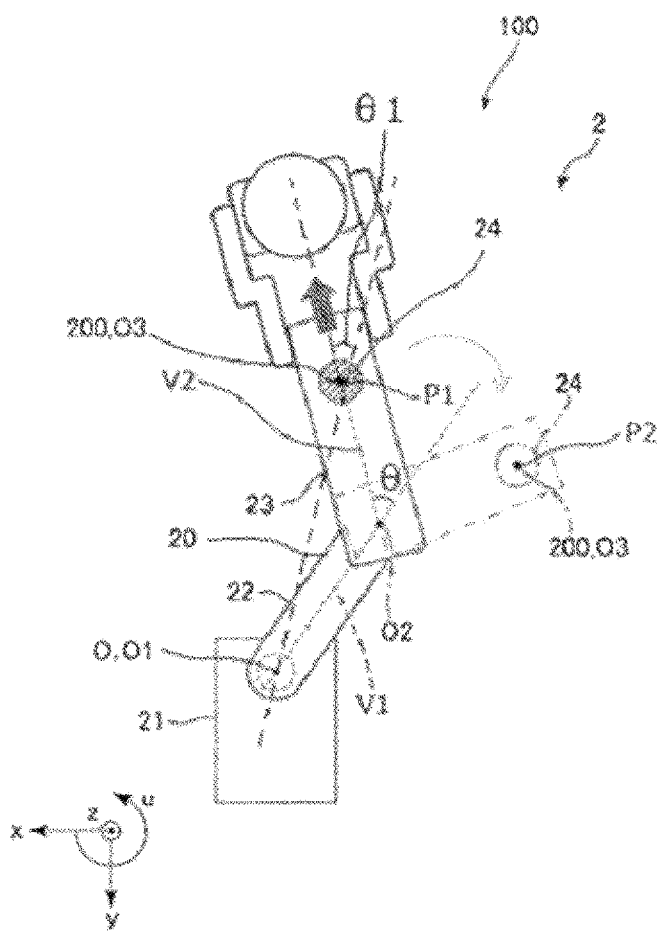
FIG. 7 explains the way teaching is performed to the robot shown in FIG. 1, as viewed from vertically above.
Figure 8:
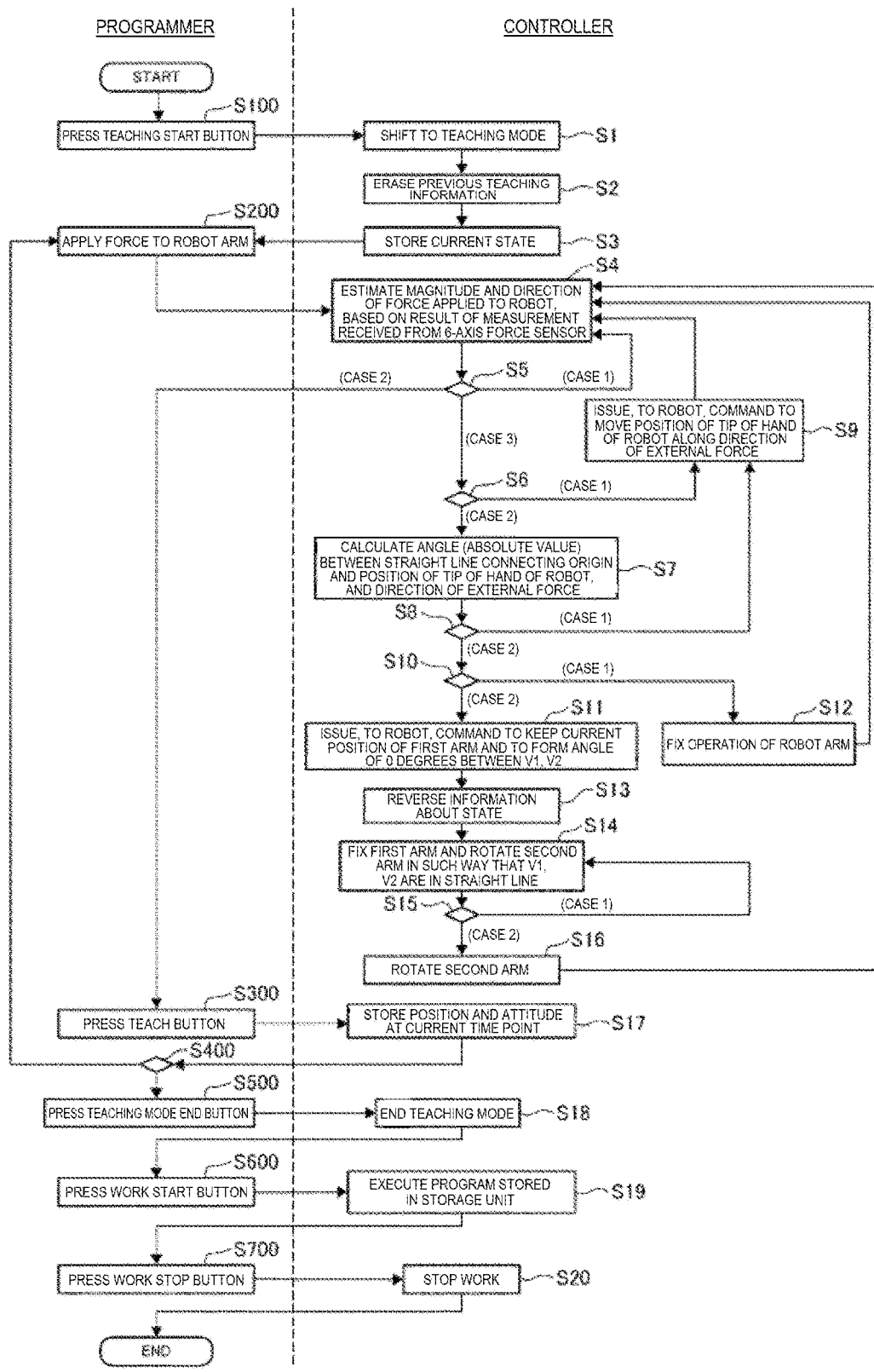
FIG. 8 explains a control operation by a control device shown in FIG. 2.

FIG. 1 is a side view showing a first embodiment of a robot system executing the teaching method according to the present disclosure. FIG. 2 is a block diagram of the robot system shown in FIG. 1. FIG. 3 is a side view of a force detection unit shown in FIG. 1. FIG. 4 is a cross-sectional view taken along A-A in FIG. 3. FIGS. 5 to 7 explain the way teaching is performed to a robot shown in FIG. 1, as viewed from vertically above. FIG. 8 explains a control operation by a control device shown in FIG. 2.

In FIG. 1 and FIGS. 3 to 7, for the sake of convenience of the description, an x-axis, a y-axis, and a z-axis are illustrated as three axes orthogonal to each other. In the description below, a direction parallel to the x-axis is referred to as an "x-axis direction". A direction parallel to the y-axis is referred to as a "y-axis direction". A direction parallel to the z-axis is referred to as a "z-axis direction". In the description below, the distal end side of each arrow in the illustrations is referred to as "+(positive)" and the proximal side is referred to as "− (negative)". A direction parallel to the +x-axis direction is referred to as a "+x-axis direction". A direction parallel to the −x-axis direction is referred to as a "−x-axis direction". A direction parallel to the +y-axis direction is referred to as a "+y-axis direction". A direction parallel to the −y-axis direction is referred to as a "−y-axis direction". A direction parallel to the +z-axis direction is referred to as a "+z-axis direction". A direction parallel to the −z-axis direction is referred to as a "−z-axis direction". A direction about the z-axis and an axis parallel to the z-axis is referred to as a "u-axis direction".

In the description below, for the sake of convenience of the description, the +z-axis direction in FIG. 1, that is, the upper side, is referred to as "up" or "above". The −z-axis direction, that is, the lower side, is referred to as "down" or "below". In a robot arm 20, the end on the side of a base 21 in FIG. 1 is referred to as a "proximal end". The opposite end, that is, the end on the side of an end effector 7, is referred to as a "distal end". The z-axis direction in FIG. 1, that is, an up-down direction, is defined as a "vertical direction. The x-axis direction and the y-axis direction, that is, a left-right direction, is defined as a "horizontal direction".

A robot system 100 shown in FIGS. 1 and 2 is, for example, a device used in such work as holding, transporting, assembling, and inspecting a workpiece such as an electronic component and an electronic apparatus. The robot system 100 has a control device 1, a robot 2, and an end effector 7. The robot system 100 also has a display device 41, an input device 42, and the like.

The control device 1 is arranged at a different position from the robot 2, that is, outside the robot 2. In the illustrated configuration, the robot 2 and the control device 1 are electrically coupled (hereinafter simply referred to as "coupled") together via a cable 300. However, this is not limiting. The robot 2 and the control device 1 may wirelessly communicate with each other without using the cable 300. That is, the robot 2 and the control device 1 may be coupled together via wired communication or wireless communication. The control device 1 may be built in the base 21 provided in the robot 2.

In the illustrated configuration, the robot 2 is a horizontal articulated robot, that is, a SCARA robot. As shown in FIG. 1, the robot 2 has the base 21, a first arm 22, a second arm 23, a third arm 24 as a work head, and a force detection unit 5. The first arm 22, the second arm 23, and the third arm 24 together form the robot arm 20.

The robot 2 also has a drive unit 25 as a first drive unit rotating the first arm 22 in relation to the base 21, a drive unit 26 as a second drive unit rotating the second arm 23 in relation to the first arm 22, a u-drive unit 27 rotating a shaft 241 of the third arm 24 in relation to the second arm 23, a z-drive unit 28 rotating the shaft 241 in the z-axis direction in relation to the second arm 23, and an angular velocity sensor 29.

In the base 21, an origin of a robot coordinate system is set. In this embodiment, an origin O of robot coordinates is set at a position overlapping a first axis O1 as viewed from the direction of the first axis O1, described later.

As shown in FIGS. 1 and 2, the drive unit 25 is built in a casing 220 of the first arm 22 and has a motor 251 generating a drive force, a decelerator 252 decelerating the drive force of the motor 251, and a position sensor 253 detecting an angle of rotation of the rotary shaft of the motor 251 or the decelerator 252.

The drive unit 26 is built in a casing 230 of the second arm 23 and has a motor 261 generating a drive force, a decelerator 262 decelerating the drive force of the motor 261, and a position sensor 263 detecting an angle of rotation of the rotary shaft of the motor 261 or the decelerator 262.

The u-drive unit 27 is built in the casing 230 of the second arm 23 and has a motor 271 generating a drive force, a decelerator 272 decelerating the drive force of the motor 271, and a position sensor 273 detecting an angle of rotation of the rotary shaft of the motor 271 or the decelerator 272.

The z-drive unit 28 is built in the casing 230 of the second arm 23 and has a motor 281 generating a drive force, a decelerator 282 decelerating the drive force of the motor 281, and a position sensor 283 detecting an angle of rotation of the rotary shaft of the motor 281 or the decelerator 282.

As the motor 251, the motor 261, the motor 271, and the motor 281, for example, a servo motor such as an AC servo motor or DC servo motor can be used.

As the decelerator 252, the decelerator 262, the decelerator 272, and the decelerator 282, for example, a planetary gear decelerator or a strain wave gearing device or the like can be used. As the position sensor 253, the position sensor 263, the position sensor 273, and the position sensor 283, for example, an angle sensor can be used.

The drive unit 25, the drive unit 26, the u-drive unit 27, and the z-drive unit 28 are coupled respectively to corresponding motor drivers, not illustrated, and are controlled by a robot control unit 11 of the control device 1 via the motor drivers.

The angular velocity sensor 29 is built in the second arm 23, as shown in FIG. 1. Therefore, the angular velocity sensor 29 can detect an angular velocity of the second arm 23. The control device 1 controls the robot 2, based on information about the detected angular velocity.

The base 21 is fixed to, for example, a floor surface, not illustrated, with a bolt or the like. The first arm 22 is coupled to an upper end part of the base 21. The first arm 22 is rotatable about the first axis O1 along the vertical direction in relation to the base 21. When the drive unit 25 to rotate the first arm 22 is driven, the first arm 22 rotates within a horizontal plane about the first axis O1 in relation to the base 21. The amount of rotation of the first arm 22 in relation to the base 21 can be detected by the position sensor 253.

The second arm 23 is coupled to a distal end part of the first arm 22. The second arm 23 is rotatable about a second axis O2 along the vertical direction in relation to the first arm 22. The axial direction of the first axis O1 and the axial direction of the second axis O2 are the same. That is, the second axis O2 is parallel to the first axis O1. When the drive unit 26 to rotate the second arm 23 is driven, the second arm 23 rotates within a horizontal plane about the second axis O2 in relation to the first arm 22. The amount of driving, specifically, the amount of rotation of the second arm 23 in relation to the first arm 22 can be detected by the position sensor 263.

The third arm 24 is installed and supported at a distal end part of the second arm 23. The third arm 24 has the shaft 241. The shaft 241 is rotatable about a third axis O3 along the vertical direction in relation to the second arm 23 and is movable along the third axis O3. The shaft 241 is the most distal arm of the robot arm 20.

When the u-drive unit 27 to rotate the shaft 241 is driven, the shaft 241 rotates about the z-axis. The amount of rotation of the shaft 241 in relation to the second arm 23 can be detected by the position sensor 273.

When the z-drive unit 28 to move the shaft 241 in the z-axis direction is driven, the shaft 241 moves in the up-down direction, that is, in the z-axis direction. The amount of movement of the shaft 241 in the z-axis direction in relation to the second arm 23 can be detected by the position sensor 283.

In this way, the robot arm 20 has the first arm 22, the second arm 23 coupled to the first arm 22 on the side opposite to the base 21 and pivoting about the second axis O2 parallel to the first axis O1, and the third arm 24 supported by the second arm 23 and moving along the axial direction of the third axis O3 at a different position from the second axis O2 and parallel to the second axis O2. The first arm 22 and the second arm 23 can secure a sufficient moving range on an xy plane. Also, the third arm 24 enables movement in the z-axis direction.

In the robot 2, the distal end of the shaft 241 is defined as a control point 200, and a distal end coordinate system having the origin at the control point 200 is set. The distal end coordinate system and the foregoing robot coordinate system are already calibrated. Thus, coordinates in the distal end coordinate system can be calculated from coordinates in the robot coordinate system.

The control point 200 may also be set at the distal end of the end effector 7.

Various end effectors are removably coupled to a distal end part of the shaft 241. Such end effectors are not particularly limited. For example, an end effector holding an object to be transported, an end effector processing an object to be processed, an end effector used for inspection, and the like can be employed. In this embodiment, the end effector 7 is removably coupled. The end effector 7 will be described later.

In this embodiment, the end effector 7 is not a component of the robot 2. However, a part or the entirety of the end effector 7 may be a component of the robot 2. In this embodiment, the end effector 7 is not a component of the robot arm 20. However, a part or the entirety of the end effector 7 may be a component of the robot arm 20.

As shown in FIG. 1, the end effector 7 has an attachment part 71 attached to the shaft 241, a motor 72 provided at the attachment part 71, and a screw thread limit gauge 3 removably and concentrically attached to the rotary shaft of the motor 72. The end effector 7 is removably coupled to the distal end part of the shaft 241.

The motor 72 is not particularly limited. For example, a servo motor such as an AC servo motor or DC servo motor, or a stepping motor or the like is used.

The end effector 7 has an angle sensor, not illustrated, for detecting an angle of rotation of the rotary shaft of the motor 72, and thus can detect the angle of rotation of the rotary shaft of the motor 72 via the angle sensor.

In the end effector 7, a drop in the accuracy of rotation due to a backlash can be restrained, compared with the case where a power transmission mechanism such as a gear and a belt is arranged between the rotary shaft of the motor 72 and the screw thread limit gauge 3.

In this embodiment, the end effector 7 is removable from the robot arm 20. However, this is not limiting. For example, the end effector 7 may be unable to be removed from the robot arm 20.

The force detection unit 5 will now be described.

As shown in FIGS. 1 and 3, the force detection unit 5 is configured to detect a force applied to the robot 2, that is, a force applied to the robot arm 20 and the base 21. The force detection unit 5 is provided below the base 21, that is, on the −z side, and supports the base 21 from below.

As shown in FIG. 3, the force detection unit 5 is a member with a cylindrical outer shape, having a first plate 51, a second plate 52, a cylindrical part 53 arranged between the first plate 51 and the second plate 52, and a plurality of elements 54, in this embodiment four elements 54. The four elements 54 are held between the first plate 51 and the second plate 52. The number of elements 54 is not limited to this and may be three or fewer, or five or more.

The first plate 51 and the second plate 52 are circular disk-shaped and are arranged in this order from the +z side and spaced apart from each other. The shape of the first plate 51 and the second plate 52 as viewed in a plan view is not limited to circle and may be any shape.

The cylindrical part 53 in this embodiment has a circular cylindrical shape and has the function of protecting the elements 54.

The respective elements 54 are arranged at an equal interval to form a circle. This makes the force applied to these elements 54 as uniform as possible and enables accurate detection of the force.

For these elements 54, for example, an element formed of a piezoelectric member such as quartz crystal and outputting electric charge in response to an external force applied thereto can be used. The control device 1 can convert the amount of electric charge into the external force applied to the end effector 7. Such a piezoelectric member can adjust the direction in which electric charge is generated in response to an external force applied thereto, according to the direction of installation.

In this embodiment, each element 54 can detect a component force Fz in the vertical direction and a force Fu about the z-axis, that is in the u-axis direction, as shown in FIG. 4. That is, the force detection unit 5 detects the force Fz in the axial direction of the third axis O3. Thus, the work of moving the shaft 241 in the z-axis direction can be carried out more accurately.

The control device 1 is coupled to such a robot 2 via the cable 300.

As shown in FIG. 2, the control device 1 has the robot control unit 11 executing the teaching method according to the present disclosure, an end effector control unit 12, a display control unit 13, a storage unit 14, and an acceptance unit 15, and controls the driving of each part of the robot system 100, such as the robot 2, the motor 72 of the end effector 7, and the display device 41.

The control device 1 will now be described.

As shown in FIG. 1, the control device 1 has the function of controlling the driving of the robot 2 and is communicatively coupled to the robot 2. The communication between the robot 2 and the control device 1 may be via wired connection or wireless connection. In the illustrated configuration, the control device 1 is arranged at a different position from the robot 2, that is, a distant position from the robot 2. However, the control device 1 may be built in the robot 2.

As shown in FIG. 2, the control device 1 includes the robot control unit 11, the end effector control unit 12, the display control unit 13, the storage unit 14 having a memory or the like, and the acceptance unit 15 having an external interface (I/F). The components of the control device 1 are communicatively coupled to each other via various buses.

The robot control unit 11 controls the driving of the robot 2, that is, the driving of the robot arm 20 or the like. The robot control unit 11 is a computer where a program such as an OS is installed. The robot control unit 11 has, for example, a CPU as a processor, a RAM, and a ROM where a program is stored. The function of the robot control unit 11 can be implemented, for example, by the CPU executing various programs.

The robot control unit 11 can estimate a position on the robot arm 20 where a force is applied and the magnitude of the force, based on the magnitude and direction of the force detected by each element 54 of the force detection unit 5 and the positional relationship between the origin of robot coordinates and the control point. A calibration curve and a computational formula used for the estimation are stored in the storage unit 14.

The end effector control unit 12 controls the driving of the motor 72. The end effector control unit 12 is a computer where a program such as an OS is installed. The end effector control unit 12 has, for example, a CPU as a processor, a RAM, and a ROM where a program is stored. The function of the end effector control unit 12 can be implemented, for example, by the CPU executing various programs.

The display control unit 13 has the function of causing the display device 41 to display various screens such as windows, and letters and the like. That is, the display control unit 13 controls the driving of the display device 41. The function of the display control unit 13 can be implemented, for example, by a GPU or the like.

In the storage unit 14, various programs that can be executed by the robot control unit 11, the end effector control unit 12, and the display control unit 13, and reference data, threshold, calibration curve and the like used during the control operation are stored. The various programs include a program for executing the teaching method according to the present disclosure. Also, various data accepted by the acceptance unit 15 can be stored in the storage unit 14. The storage unit 14 includes, for example, a volatile memory such as a RAM (random-access memory), and a non-volatile memory such as a ROM (read-only memory), or the like. The storage unit 14 is not limited to a non-removable type and may have a removable external storage device. The storage unit 14 may be installed at a different place via a network such as a LAN (local area network).

The acceptance unit 15 has an external interface (I/F) and is used for coupling the robot 2, the display device 41, and the input device 42 or the like. The acceptance unit 15 functions as an acquisition unit which receives, that is, acquires, a teaching signal from the input device 42. The "teaching signal" in this case is a signal transmitted from the input device 42 when the input device 42 is operated, that is, a timing signal. A teacher operates the input device 42 at an arbitrary timing. The position and attitude of the robot arm 20 when the acceptance unit 15 acquires a signal from the input device 42 is stored as teaching information into the storage unit 14, thus performing teaching.

The "position" of the "position and attitude of the robot arm 20" refers to the coordinates of the control point 200 of the robot arm 20 in the robot coordinate system. The "attitude" refers to the attitude of the first arm 22 and the second arm 23. The attitude of the first arm 22 and the second arm 23 can be recognized, based on the result of output from the position sensor 253 and the position sensor 263. Also, the coordinates of the control point 200 of the robot arm 20 in the robot coordinate system can be specified, based on the attitude of the first arm 22 and the second arm 23. A calibration curve representing these relationships is stored in the storage unit 14.

As the acceptance unit 15 acquires the teaching signal, the robot control unit 11 specifies the position of the control point at the time, based on the result of detection from the position sensor 253 and the position sensor 263 and the calibration curve, and defines the position, that is, the coordinates, as a teaching point. Information about the teaching point is stored in the storage unit 14 and used for work performed by the robot 2.

The control device 1 may have another component in addition to the foregoing components. The various programs, data and the like saved in the storage unit 14 may be stored in the storage unit 14 in advance, or may be stored in a recording medium such as a CD-ROM and provided from this recording medium, or may be provided via a network or the like.

The display device 41 has, for example, a monitor, not illustrated, formed of a liquid crystal display, EL display or the like. The display device 41 has, for example, the function of displaying various images, letters and the like, including various screens such as windows.

The input device 42 is formed of, for example, a mouse, a keyboard, a mobile terminal, a teaching pendant or the like. Therefore, by operating the input device 42, the user can give an instruction to perform various kinds of processing to the control device 1. The input device 42 also has a teach button, a switch button, a teaching start button, and a teaching end button, as described later.

In this embodiment, a display input device having the functions of the display device 41 and the input device 42 may be provided instead of the display device 41 and the input device 42. As the display input device, for example, a touch panel such as an electrostatic touch panel or a pressure-sensitive touch panel can be used. The input device 42 may also be configured to recognize a sound such as a speech.

At least one of the display device 41 and the input device 42 may be provided in the robot 2, for example, in the second arm 23.

The configuration of the robot system 100 has been described so far.

Now, teaching to store the position and attitude of the robot arm 20 into the storage unit 14 before the robot arm 20 performs work, will be described. The teaching method according to the present disclosure is carried out in a direct teaching style where the operator actually pushes or pulls the robot arm 20 so as to perform teaching.

For example, as shown in FIG. 5, when performing work such that the robot arm 20 moves from a position and attitude indicated by a solid line to a position and attitude indicated by a double-dot chain line, that is, when performing work such that the control point 200 moves from a position P1 to a position P2, the operator actually moves the robot arm 20 and stores the path of the movement into the storage unit 14.

Specifically, for example, when the operator presses a predetermined site on the second arm 23, an indirect force is applied to the force detection unit 5. Based on this force, the robot control unit 11 estimates the magnitude and direction of the force applied to the second arm 23. Based on the result of the estimation, the robot control unit 11 drives the drive unit 25 and the drive unit 26. The robot arm 20 is moved and displaced in the direction in which the operator is to move the robot arm 20. The position and attitude of the robot arm 20 is thus changed.

While such an operation is carried out until the control point 200 moves from the position P1 to the position P2, the position and attitude is sequentially stored into the storage unit 14 at a predetermined timing. Thus, the process of the robot arm 20 being moved and displaced from the position and attitude indicated by the solid line to the position and attitude indicated by the double-dot chain line can be stored.

As shown in FIGS. 5 to 7, the robot arm 20 performs work basically in the state where the joint thereof is bent, except in a switching operation, described later. Also, in a teaching process, the robot arm 20 is displaced basically in the bent state, except in the switching operation. In the switching operation, described later, a first imaginary line V1 and a second imaginary line V2 are momentarily in a straight line. Otherwise, the robot arm 20 is in the bent state.

The bent state refers to the state where the first arm 22 and the second arm 23 are not in a straight line. That is, when the first imaginary line V1, which is a straight line passing through the first axis O1 and the second axis O2, and the second imaginary line V2, which is a straight line passing through the second axis O2 and the third axis O3, are set, as viewed in a plan view where the robot 2 is viewed from a direction along the first axis O1, that is, from vertically above, the bent state refers to the state where the first imaginary line V1 and the second imaginary line V2 are not in a straight line. In other words, the bent state refers to the state where the third axis O3 does not overlap the first imaginary line V1, as viewed in a plan view from vertically above.

The state where the robot arm 20 is bent includes the following two patterns.

(i) The third axis O3 is located at one side of the first imaginary line V1, as viewed in a plan view from vertically above. In this embodiment, the one side is defined as the left side in FIGS. 5 to 7.

(ii) The third axis O3 is located at the other side of the first imaginary line V1, as viewed in a plan view from vertically above. In this embodiment, the other side is defined as the right side in FIGS. 5 to 7.

In the description below, the state (i) is referred to as a first state and the state (ii) is referred to as a second state. The first state may also be referred to as a right-arm configuration. The second state may also be referred to as a left-arm configuration.

When teaching the robot 2, for example, when teaching the robot 2 to move the control point 200 from the position P1 to the position P2, the operator may teach, keeping the first state, as shown in FIG. 5 or may teach, switching between the first state and the second state in the course of teaching, as shown in FIG. 6.

In the switching operation of switching between the first state and the second state, the robot control unit 11 drives the drive unit 26 to rotationally drive the second arm 23 in relation to the first arm 22. Thus, the robot arm 20 can be switched from the first state indicated by a solid line in FIG. 7 to the second state indicated by a double-dot chain line in FIG. 7.

In this way, the robot 2 has the drive unit 25 as the first drive unit rotating the first arm 22 in relation to the base 21, and the drive unit 26 as the second drive unit rotating the second arm 23 in relation to the first arm 22. In the switching operation, the drive unit 26 as the second drive unit is driven. This can reduce the workload of the operator in switching between the first state and the second state.

Switching between the first state and the second state in the course of teaching enables, for example, reduction in the amount of rotation of the first arm 22 in relation to the base 21. Therefore, the total amount of rotation, which is the sum of the amount of rotation of the first arm 22 in relation to the base 21 and the amount of rotation of the second arm 23 in relation to the first arm 22, can be reduced. Particularly, reducing the amount of rotation of the first arm 22 in relation to the base 21 enables effective restraining of power consumption.

According to the related art, when carrying out such switching, the operator temporarily stops moving the robot arm 20 and then carries out such an operation as holding a teaching device and pressing a switch button at a desired timing. However, in such a method, the series of operations are complicated and the switching operation cannot be easily carried out.

In contrast, the robot system 100 is configured in such a way that switching between the first state and the second state takes place, that is, switching from the current state to the other state takes place, according to the result of detection by the force detection unit 5. In this embodiment, the robot system 100 is configured in such a way that the switching operation is carried out, triggered by an operation of pulling the robot arm 20 in a direction away from the base 21 by the operator. Thus, the operation such as holding the teaching device and pressing the switch button as in the related art can be omitted. The operator can carry out the operation of moving the robot arm 20 and the operation of giving a switching instruction, as a sequential flow. Thus, the switching between the states can be easily carried out.

Specifically, when a force component in a direction from the first axis O1 toward the third axis O3, in this embodiment, a force component from the origin O to the third axis O3 detected by the force detection unit 5 exceeds a threshold, the robot 2 performs the switching operation. The threshold is a set value stored in the storage unit 14 in advance. In this way, a threshold is provided, and when the force component exceeds the threshold, it is assumed that a switching instruction is given. Therefore, for example, an operation of pulling and stretching the bent robot arm 20 and the switching instruction can be discriminated from each other. Thus, the switching operation can be performed accurately.

On receiving the switching instruction, the robot control unit 11 permits the switching operation when an angle θ formed by the first imaginary line V1 and the second imaginary line V2 is smaller than a predetermined value, and prohibits the switching operation when the angle θ is equal to or greater than the predetermined value. Thus, for example, the operation of pulling and stretching the bent robot arm 20 and the switching instruction can be discriminated from each other. The switching operation can be performed accurately.

The control operation by the robot control unit 11, that is, the teaching method according to the present disclosure, will now be described with reference to a flowchart shown in FIG. 8. In the description below, steps S100 to S700 are processes carried out by the operator and steps S1 to S20 are processes carried out by the robot control unit 11.

First, in step S100, the operator presses the teaching start button on the input device 42 and thus starts a teaching mode. In response to this, the robot 2 shifts to the teaching mode (step S1).

In step S2, the previous teaching information is erased from the storage area in the storage unit 14. This step may be omitted. That is, information stored in the past teaching process may be stored.

Next, in step S3, the current state is detected, specified as one of the first state and the second state, and stored. In this step, the attitude of the first arm 22 and the second arm 23 is recognized, based on the result of output from the position sensor 253 and the position sensor 263, and whether the current state is the first state or the second state can thus be specified.

Such a step S3 is a storage process performed prior to the execution of a teaching process, described later. Executing this storage process enables the current state to be grasped more accurately.

At this point, an operation of teaching by the operator can be accepted. Then, the process shifts to the teaching process. Step S5 onward is the teaching process.

Next, in step S200, the operator applies a force to the robot arm 20. In the robot system 100, the magnitude and direction of the force applied to the robot arm 20 is calculated, based on the result of detection by the force detection unit 5. In the description below, it is assumed that the operator applies a force to the second arm 23.

Next, in step S4, the magnitude and direction of the external force applied to the robot arm is estimated, based on the result of detection by the force detection unit 5. Then, in step S5, the magnitude and direction of the force calculated in step S4 is determined in the following manner.

Case 1: The magnitude of the detected force is less than a first threshold Fa. In this case, the force applied by the operator is determined as insufficient and the process returns to step S4, where the magnitude and direction of the force is estimated again.

Case 2: The detected force is 0 for a predetermined time. In this case, the operator presses the teach button in step S300 and the process shifts to step S17.

Case 3: The magnitude of the detected force is equal to or greater than the first threshold Fa. In this case, it is determined that the operator has applied a force to the robot arm 20, and the process shifts to step S6.

Next, in step S6, the degree of bending of the robot arm at the current time point, that is, the angle θ formed by the first imaginary line V1 and the second imaginary line V2, is compared with a predetermined angle θa as a preset threshold, and is determined in the following manner.

Case 1: The angle θ is equal to or greater than the predetermined angle θa. In this case, the process shifts to step S9, where the position and attitude of the robot arm 20 is changed and the position of the control point 200 is thus changed, according to the magnitude and direction of the applied external force. That is, a command to move the position of the tip of the hand of the robot 2 along the direction of the external force is issued to the robot 2. Preferably, with the displacement and movement of the robot arm 20 in step S9, the position and attitude of the robot arm 20 is stored, for example, at a predetermined time interval. In this case, preferably, the position of the control point 200 set on the third arm 24 and the information about whether the current state is the first state or the second state are stored in association with each other. Thus, the position and attitude can be stored accurately.

Case 2: The angle θ is smaller than the predetermined angle θa. In this case, the process shifts to step S7.

In step S7, the angle θ1 formed by a straight line connecting the origin O of the robot 2 and the third axis O3 and the direction of the external force, as viewed from vertically above, is calculated.

Next, in step S8, the angle calculated in step S7 is compared with a predetermined angle θb as a preset threshold and is determined in the following manner.

Case 1: The angle calculated in step S7 is equal to or greater than the predetermined angle θb. In this case, the operation is determined as an operation in normal teaching, and the process shifts to the foregoing step S9.

Case 2: The angle calculated in step S7 is smaller than the predetermined angle θb. In this case, the operation is determined as a pulling operation, and the processing shifts to step S10.

In step S10, the magnitude of the force detected in step S4 is compared with a second threshold Fb and is determined in the following manner.

Case 1: The magnitude of the detected force is smaller than the second threshold Fb. In this case, the process shifts to step S12. In step S12, a command to cancel the external force and fix the operation of the robot arm 20 is issued to the drive unit 25 and the drive unit 26. Then, the process returns to step S4 again.

Case 2: The magnitude of the detected force is equal to or greater than the second threshold Fb. In this case, the process shifts to step S11.

In step S11, a command to keep the first arm 22 in the current position and attitude and rotate the second arm 23 in relation to the first arm 22 so that the first imaginary line V1 and the second imaginary line V2 are laid in a straight line is issued to the drive unit 26.

Next, in step S13, the information about the state stored in the storage unit 14 is reversed and updated. That is, the information about the state stored in step S3, which is one of the first state and the second state, is updated to information about the other state and then stored.

Next, in step S14, a command to keep the first arm 22 in the current position and attitude and fix the first imaginary line V1 and the second imaginary line V2 in a straight line is issued to the drive unit 25 and the drive unit 26.

Next, in step S15, the magnitude of the force detected at the current time point is compared with the second threshold Fb and is determined in the following manner.

Case 1: The magnitude of the detected force is equal to or greater than the second threshold Fb. In this case, the process returns to step S14 again.

Case 2: The magnitude of the detected force is smaller than the second threshold Fb. In this case, the pulling operation by the operator is determined as finished, and the process shifts to step S16.

In step S16, the second arm 23 is rotated further in the same direction as the direction of rotation in step S14 from the state where the first imaginary line V1 and the second imaginary line V2 are in a straight line. The angle of rotation is, for example, approximately 2° or greater and 20° or smaller. In this step S16, the switching operation between the first state and the second state is completed.

Then, the process returns to step S4 again and the subsequent steps are sequentially repeated.

Meanwhile, as the operator presses the teach button in step S300, the robot system 100 shifts to step S17. In step S17, the position and attitude at the current time point is stored.

Next, in step S400, the operator determines whether to end the teaching mode or not. In step S500, the operator presses the teaching mode end button. In response to this, the robot system 100 ends the teaching mode in step S18.

Next, in step S600, the operator presses a work start button, not illustrated, provided in the control device 1. In response to this, the robot system 100 in step S19 executes work, based on the program and teaching information stored in the storage unit 14.

Then, as the operator presses a work stop button in step S700, the robot system 100 stops the work in step S20.

As described above, the teaching method according to the present disclosure is for teaching a position and attitude of the robot arm 20 to a robot. The robot includes: the base 21; the robot arm 20 having the first arm 22 that is coupled to the base 21 and that rotates about the first axis O1, the second arm 23 that is coupled to the first arm 22 and that rotates about the second axis O2 parallel to the first axis O1, and the third arm 24 that is coupled to the second arm 23 and that rotates about the third axis O3 parallel to the first axis O1 and the second axis O2 or that moves along the third axis O3; and the force detection unit 5 detecting a force applied to the robot arm 20. The robot is configured to switch between the first state where the third axis O3 is located at one side of the first imaginary line V1 and the second state where the third axis O3 is located at the other side of the first imaginary line V1, the first imaginary line V1 being set as a straight line passing through the first axis O1 and the second axis O2 when the robot arm 20 is viewed from a direction along the first axis O1. The method includes performing the switching operation of switching between the first state and the second state according to a result of detection by the force detection unit 5. Thus, the operation of holding a teaching device and pressing a switch button as in the related art can be omitted. The operator can carry out the operation of moving the robot arm 20 and the operation of giving a switching instruction, as a sequential flow. Thus, the switching operation can be easily carried out.

When an angle θ1 formed by a straight line connecting the first axis O1 and the third axis O3 and the direction of a force detected by the force detection unit 5 is smaller than a predetermined angle, as viewed from a direction along the first axis O1, and the magnitude of the force detected by the force detection unit 5 is less than a threshold, the switching operation is carried out. In this way, a threshold is provided for the magnitude and direction of the detected force, and when the threshold is exceeded, it is assumed that a switching instruction is given. Therefore, for example, the operation of pulling and stretching the bent robot arm 20 and the switching instruction can be discriminated from each other. Thus, the switching operation can be performed accurately.

In the teaching process, when the angle θ formed by the first imaginary line V1 and the second imaginary line V2 is smaller than a predetermined value, where the second imaginary line V2 is set as a straight line passing through the second axis O2 and the third axis O3, as viewed from a direction along the first axis O1, the switching operation is permitted. Thus, for example, the operation of pulling and stretching the bent robot arm 20 and the switching instruction can be discriminated from each other. The switching operation can be performed accurately.

Modification Example

In a teaching process according to this modification example, when the switching operation is performed, the position and attitude of the robot arm when the switching operation is started, and the position and attitude of the robot arm 20 when the switching operation is completed, are stored. Thus, the position where the switching operation is performed and the degree by which the second arm 23 is rotated can be taught. Therefore, the reproducibility of teaching in work can be improved further.

The teaching method according to the present disclosure has been described, based on the illustrated embodiment. However, the present disclosure is not limited to this embodiment. The configuration of each process can be replaced with that of any process having a similar function. Also, any other process may be added.

In the embodiment, the switching operation is triggered by the pulling operation by the operator. However, the present disclosure is not limited to this. For example, the switching operation may be triggered by application of a vibration of a predetermined pattern by the operator.

In the embodiment, the number of axes of rotation of the robot arm is three. However, the present disclosure is not limited to this. The number of axes of rotation of the robot arm may be, for example, four or more. That is, while the number of arms in the embodiment is three, the present disclosure is not limited to this. The number of arms may be four or more.

What is claimed is:

1. A teaching method for teaching a position and attitude of a robot arm to a robot,
the robot comprising:
a base;
the robot arm having a first arm that is coupled to the base and that rotates about a first axis, a second arm that is coupled to the first arm and that rotates about a second axis parallel to the first axis, and a third arm that is coupled to the second arm and that rotates about a third axis parallel to the first axis and the second axis or that moves along the third axis, the third arm has a shaft whose distal end is defined as a control point; and
a force detection unit detecting a force applied to the robot arm,
the robot being configured to switch between a first state where the third axis is located at one side of a first imaginary line and a second state where the third axis is located at the other side of the first imaginary line, the first imaginary line being set as a straight line passing through the first axis and the second axis when the robot arm is viewed from a direction along the first axis,
the method comprising:
performing a switching operation of switching between the first state and the second state according to a result of detection by the force detection unit,
wherein in the teaching, when an angle formed by the first imaginary line and a second imaginary line is smaller than a predetermined value, the second imaginary line being set as a straight line passing through the second axis and the third axis, as viewed from a direction along the first axis, the switching operation is permitted, and when the angle formed by the first imaginary line and the second imaginary line is equal to or greater than the predetermined value, the position and attitude of the robot arm is changed and the position of the control point is thus changed, according to the magnitude and direction of the applied force.

2. The teaching method according to claim 1, wherein when an angle formed by a straight line connecting the first axis and the third axis and a direction of a force detected by the force detection unit is smaller than a predetermined angle, as viewed from a direction along the first axis, and a magnitude of the force detected by the force detection unit is less than a threshold, the switching operation is carried out.

3. The teaching method according to claim 1, wherein the robot further comprises a first drive unit rotating the first arm in relation to the base, and a second drive unit rotating the second arm in relation to the first arm, and in the switching operation, the second drive unit is driven.

4. The teaching method according to claim 1, wherein when the switching operation is performed, the position and attitude of the robot arm when the switching operation is started, and the position and attitude of the robot arm when the switching operation is completed, are stored.

5. The teaching method according to claim 1, wherein a position of a control point set on the third arm and information about whether the robot is in the first state or the second state are stored in association with each other.

* * * * *